(12) United States Patent   (10) Patent No.:   US 12,644,770 B2

Lee   (45) Date of Patent:   Jun. 2, 2026

(54) SINGLE-DETECTOR DOUBLE-PATH INTENSITY-MODULATION SPECTROMETER

(71) Applicant: Government of the United States of America, as represented by the Secretary of Commerce, Gaithersburg, MD (US)

(72) Inventor: Young Jong Lee, Gaithersburg, MD (US)

(73) Assignee: Government of the United States of America, as represented by the Secretary of Commerce, Gaithersburg, MD (US)

( * ) Notice: Subject to any disclaimer, the term of this patent is extended or adjusted under 35 U.S.C. 154(b) by 19 days.

(21) Appl. No.: 18/514,008

(22) Filed: Nov. 20, 2023

(65) Prior Publication Data

US 2024/0167877 A1    May 23, 2024

Related U.S. Application Data

(60) Provisional application No. 63/426,486, filed on Nov. 18, 2022.

(51) Int. Cl.
  *G01J 3/42*    (2006.01)
  *G01J 3/02*    (2006.01)
  (Continued)

(52) U.S. Cl.
  CPC ............. *G01J 3/433* (2013.01); *G01J 3/0229* (2013.01); *G01N 21/3103* (2013.01)

(58) Field of Classification Search
  CPC ...... G01J 3/45; G01J 3/42; G01J 3/433; G01J 3/0229; G01J 3/0208; G01J 3/08; G01J 3/0205; G01B 9/02; G01N 21/3103
  See application file for complete search history.

(56) References Cited

U.S. PATENT DOCUMENTS 3,659,945 A      5/1972  Roche et al.
3,805,074 A  *  4/1974  McCormack ...... G01N 21/3504
                                  250/354.1

(Continued)

FOREIGN PATENT DOCUMENTS

CN      109983323 A  *  7/2019  ............... G01J 3/08
JP      59203927      11/1984
WO    20170403431 A1    3/2017

OTHER PUBLICATIONS

Akhgar, C.K., et al., "Application of Quantum Cascade Laser-Infrared Spectroscopy and Chemometrics for In-Line Discrimination of Coeluting Proteins from Preparative Size Exclusion Chromatography", Analytical Chemistry, 2022, p. 11192-11200, vol. 94.

(Continued)

*Primary Examiner* — Abdullahi Nur
(74) *Attorney, Agent, or Firm* — Office of Chief Counsel for National Institute of Standards and Technology

(57)   ABSTRACT

A method of determining an optical spectrum for a sample substance includes splitting a source beam into a reference beam and a sample beam, periodically modulating the intensity of the beams out of phase of each other, directing the reference beam through a reference substance and the sample beam through the sample substance. The beams are then recombined, and a single detector detects the intensity difference at the modulation frequency to determine the spectrum of the sample substance.

13 Claims, 3 Drawing Sheets

(51) Int. Cl.
    *G01J 3/433*         (2006.01)
    *G01N 21/31*         (2006.01)

(56)              References Cited

U.S. PATENT DOCUMENTS

| | | | |
|---|---|---|---|
| 4,241,997 A * | 12/1980 | Chraplyvy | G01N 21/39 |
| | | | 356/309 |
| 4,455,097 A | 6/1984 | Ichikawa et al. | |
| 4,508,451 A | 4/1985 | Stockdale | |
| 4,577,105 A * | 3/1986 | Krempl | G01N 21/534 |
| | | | 250/343 |
| 4,807,993 A * | 2/1989 | Nakamura | G01J 1/16 |
| | | | 356/325 |
| 5,106,190 A | 4/1992 | Fukuma | |
| 6,949,734 B2 | 9/2005 | Neff et al. | |
| 9,110,006 B1 | 8/2015 | Hovde et al. | |
| 10,801,950 B2 * | 10/2020 | Kangas | G01J 3/36 |
| 2015/0160126 A1 * | 6/2015 | Carangelo | G01N 21/3504 |
| | | | 356/437 |
| 2018/0238794 A1 * | 8/2018 | Kangas | G02B 3/0056 |

OTHER PUBLICATIONS

Chon, B., et al., "Compensation of Strong Water Absorption in Infrared Spectroscopy Reveals the Secondary Structure of Proteins in Dilute Solutions", Analytical Chemistry, 2021, p. 2215-2225, vol. 94.

International Search Report from PCT/US2023/080483 file date Nov. 20, 2023.

\* cited by examiner

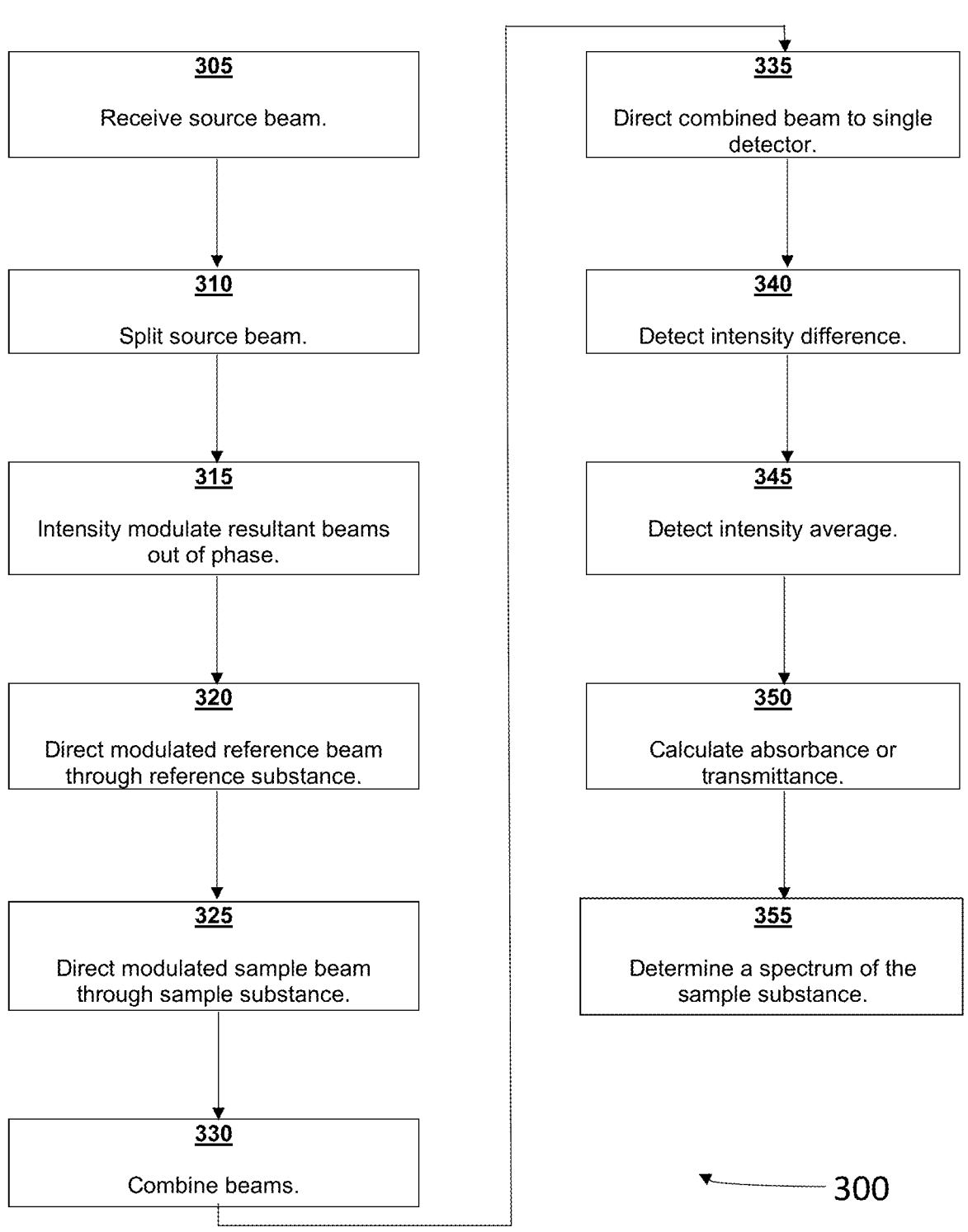

305

Receive source beam.

310

Split source beam.

315

Intensity modulate resultant beams out of phase.

320

Direct modulated reference beam through reference substance.

325

Direct modulated sample beam through sample substance.

330

Combine beams.

335

Direct combined beam to single detector.

340

Detect intensity difference.

345

Detect intensity average.

350

Calculate absorbance or transmittance.

355

Determine a spectrum of the sample substance.

SINGLE-DETECTOR DOUBLE-PATH INTENSITY-MODULATION SPECTROMETER

RELATED APPLICATIONS

This application claims the benefit of U.S. Provisional Patent Application Ser. No. 63/426,486 (filed Nov. 18, 2022), which is herein incorporated by reference in its entirety.

FEDERALLY-SPONSORED RESEARCH AND DEVELOPMENT

This invention was made with United States Government support from the National Institute of Standards and Technology (NIST), an agency of the United States Department of Commerce. The Government has certain rights in this invention.

FIELD OF INVENTION

The present invention relates generally to spectroscopy, and more particularly to lowering noise by utilizing single-detector, double-path spectroscopy.

BACKGROUND

Absorption spectrometry is based on the measurement of transmission spectra through an analyte and a reference.

SUMMARY OF INVENTION

In mid-infrared spectroscopy, the system fluctuations from the light source and the detection system affect the optical system performance significantly. Conventional approaches using a two-beam two-detector configuration can eliminate the fluctuation contribution from the light source and environment. However, using an additional detector accompanies an unwanted noise increase from multiple detectors and preamplifiers. Exemplary embodiments keep a double-path configuration but use only a single detector to reduce the laser fluctuation contribution without increasing the detection system noise. The double beams are rapidly modulated out-of-phase to each other, transmitted through an analyte and the reference separately, and directed to a single detector. The intensity difference of the measured modulation signal is amplified by a lock-in amplifier and recorded as a function of wavelength. Exemplary embodiments minimize the noise from the laser and other system fluctuations, maximize the sensitivity of absorbance measurement, and, thus, lower the detection limit of analytes.

According to one aspect of the invention, a double path spectrophoto-metry system includes a light source; a splitter configured to split the light source beam into a sample beam and a reference beam path; a sample beam path intensity modulator configured to intensity-modulate the sample beam into an intensity-modulated sample beam; a reference beam path intensity modulator configured to intensity-modulate the reference beam into an intensity-modulated reference beam out of phase with the intensity-modulated sample beam; a sample cell, wherein the system is configured to pass the intensity-modulated sample beam through the sample cell to create a sampled beam; a reference cell, wherein the system is configured to pass the intensity-modulated reference beam through the reference cell to create a referenced beam; a combiner configured to combine the sampled beam and the referenced beam into a combined beam; a detector configured to detect the intensity of the combined beam, thereby measuring a modulation signal.

Optionally, the double path spectrophotometry also includes a preamplifier; a lock-in amplifier; and a controlling program and computer interface.

Optionally, the splitter is a beam splitter.

Optionally, the combiner is a focusing optics.

Optionally, a relative phase of the sample beam path intensity modulator and the reference beam path intensity modulator is locked out of phase by means of the mechanical geometry of the system.

Optionally, a relative phase of the sample beam path intensity modulator and the reference beam path intensity modulator is locked out of phase by a phase controller.

Optionally, an intensity of the sampled beam and an intensity of the referenced beam are equal when the reference cell and sample cell are filled with a same substance.

Optionally, an intensity of the sampled beam and an intensity of the referenced beam differ by no more than twenty-five percent when the reference cell and sample cell are filled with a same substance.

Optionally, the intensity modulators are mechanical choppers.

Optionally, the intensity modulators are acousto-optic modulators.

Optionally, the intensity modulators are electro-optic modulators.

Optionally, an intensity difference of the measured modulation signal is amplified by the lock-in amplifier and recorded as a function of wavelength.

According to another aspect of the invention, a method of determining an optical spectrum for a sample substance includes receiving a source beam from a light source; splitting the source beam into a reference beam and a sample beam; modulating an intensity of the reference beam and an intensity of the sample beam out of phase of each other; directing the modulated reference beam into a reference cell having a reference substance therein, said reference substance interacting with the modulated reference beam, said interacting yielding a referenced beam having a reference direction; directing the modulated sample beam into a sample cell having a sample substance therein, said sample substance interacting with the modulated sample beam, said interacting yielding a sampled beam having a sample direction; combining the referenced beam and the sampled beam into a combined beam; directing the combined beam to a single detector; detecting an intensity difference of the sampled beam and the referenced beam in the combined beam; calculating one of an absorbance or transmittance from the detected intensity difference; and determining a spectrum of the sample as a function of the one of the absorbance or transmittance for a plurality of light frequencies.

The foregoing and other features of the invention are hereinafter described in greater detail with reference to the accompanying drawings.

BRIEF DESCRIPTION OF THE DRAWINGS

FIG. 3 shows a flow chart of an exemplary single-detector, double-path spectroscopy method.

DETAILED DESCRIPTION

Figure 1:
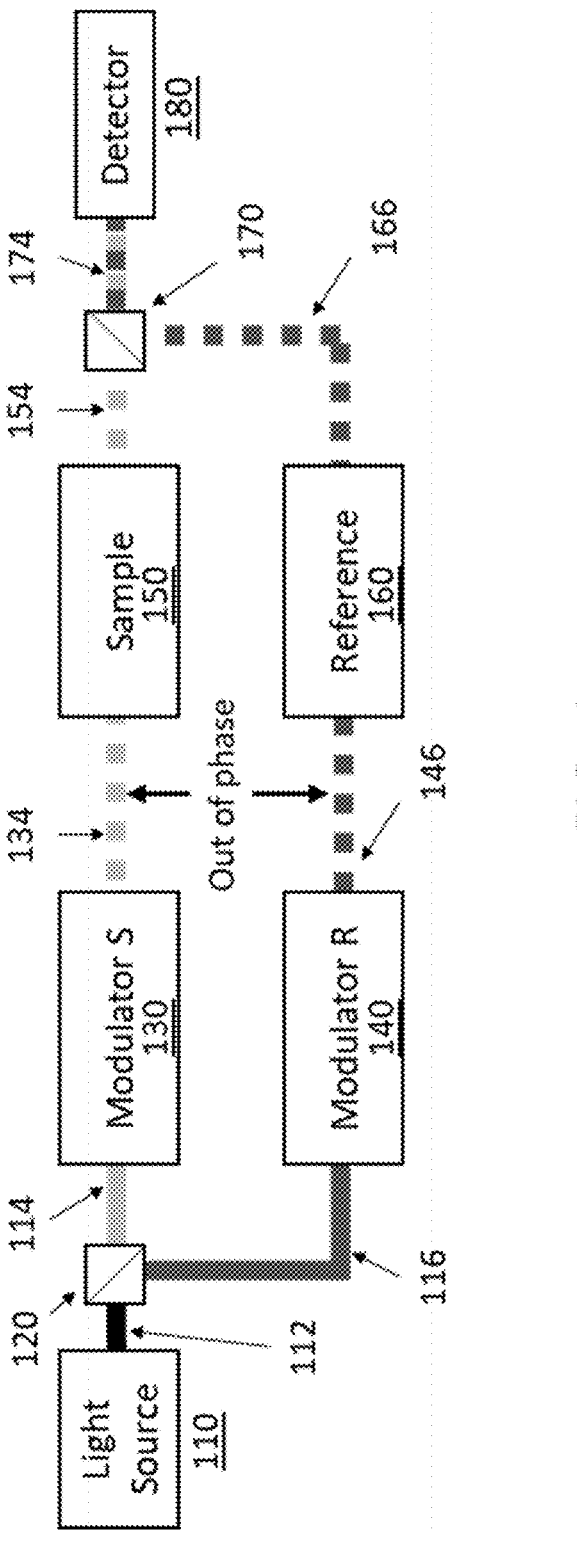
FIG. 1 shows a schematic representation of an exemplary single-detector, double-path spectroscopy system.

Absorption spectrometry is based on the measurement of transmission spectra through an analyte and a reference. Described herein is an optical method that can minimize the noise due to system fluctuations and maximize the signal-to-noise ratio by modulating the analyte beam and the reference beam and detecting the alternating intensity difference by a signal light detector. In mid-infrared spectroscopy, the system fluctuations from the light source and the detection system affect the optical system performance significantly. Conventional approaches using a two-beam two-detector configuration can eliminate the fluctuation contribution from the light source and environment. However, using an additional detector accompanies an unwanted noise increase from multiple detectors and preamplifiers.

Infrared (IR) absorption spectroscopy has been widely used to characterize complex biomolecules, including proteins, nucleic acids, lipids, and carbohydrates. The linear dependence of absorbance on concentration (Beer-Lambert law) enables quantitative concentration measurements, and detailed peak-shape analysis yields insights into the higher-order structures and configurations of biomolecules. One of the most significant challenges for IR spectroscopies of biological samples is the strong IR absorption by water. The substantial light absorption by the solvent reduces the transmitted signal intensity, dominates the dynamic range of a detection system, and overwhelms the analyte absorption contributions to the detected signal. These limitations have led to a thrust for more intense sources of IR light, such as synchrotron radiation and the more accessible external-cavity quantum cascade laser (EC-QCL).

The use of EC-QCLs was a significant step toward improving sensitivity in IR absorption measurements. EC-QCLs provide tunable, discrete frequency light ranging from mid- to far-IR wavelengths and have been extensively deployed for IR microscopy and spectroscopy. The high intensity afforded by EC-QCLs significantly lowers the detection limit to <1 mg/mL for the amide I band of proteins. Alternatively, microfluidic modulation spectroscopy improved the signal-to-noise ratio (SNR) by measuring the signal difference as the sample and the solvent fluids were alternated in a microfluidic transmission cell.

To further improve system sensitivity, double-beam balanced detection schemes have been demonstrated by splitting an IR beam into a sample and reference beam and employing balanced detection. Lendl et al. reported IR spectra of proteins at concentrations as low as 0.1 mg/mL over the spectral range of 1500 $cm^{-1}$ to 1700 $cm^{-1}$ using two-detector double-beam balanced detection. Methods including solvent absorption compensation (SAC), may improve the sensitivity by greater than 100 times compared to configurations without SAC, demonstrating a detection limit close to 0.2 mg/mL for the amide I band of protein.

These recent advances in high-sensitivity IR spectroscopy are based on two-detector double-beam detection schemes either with subtraction or with division. The double-beam balanced detection shows clear advantages in suppressing common-mode fluctuations, such as laser intensity and system temperature. Unfortunately, most mid- and far-IR detectors suffer substantial thermal noise even after being cooled thermo-electrically or by liquid nitrogen, and employing an additional IR detector is accompanied by increased total system noise, and thus limiting the improvement of the system sensitivity.

The detection limit of analytes in absorption spectroscopy is limited by various types of noises, including light sources, detectors, amplifiers, temperature, etc. A double-beam configuration improves the signal-to-noise ratio (SNR) of a spectrometer by reducing the noise contribution from the light source and the environment. However, a conventional approach to the double-beam spectrometer is accompanied by increased noise from two separate detectors, which can be a significant problem in mid-IR spectroscopy. In contrast, an exemplary single-detector double-path intensity-modulation spectrometer keeps the advantages of the double-beam configuration and includes only one detector so that the overall system noise can be reduced.

Exemplary embodiments include an optical method and system of double-beam (double path) balanced detection using a single detector. This new method is based on an out-of-phase intensity modulation of two beams and the simultaneous detection of modulated and unmodulated signals.

The single-detector double-path intensity-modulation spectrometer can include a double-path configuration and a single detector so that the single-detector double-path intensity-modulation spectrometer reduces the laser fluctuation contribution without increasing the detection system noise. The double beams are modulated out-of-phase to each other, transmitted through an analyte and the reference separately, and directed to a single detector. The intensity difference of the measured modulation signal is amplified by a lock-in amplifier and recorded as a function of wavelength. The single-detector double-path intensity-modulation spectrometer minimizes noise from the laser and other system fluctuations, maximize the sensitivity of absorbance measurement, and, thus, lower the detection limit of analytes.

The single-detector double-path intensity-modulation spectrometer and its operation in an optical method minimizes the noise due to system fluctuations and maximizes the signal-to-noise ratio by modulating the analyte beam and the reference beam and detecting the alternating intensity difference by a signal light detector. In mid-infrared (mid-IR) spectroscopy, the system fluctuations from the light source and the detection system affect the optical system performance significantly.

As shown in FIG. 1, the double path spectrophotometry system 100 includes a light source 110 that generates a beam 112, and a splitter 120 to split the light source beam 112 into a sample beam 114 and a reference beam 116. The system 100 also includes a sample beam path intensity modulator 130 and a reference beam path intensity modulator 140. These modulators are configured to intensity modulate their respective beams 114, 116 into intensity-modulated beams 134, 146 that are out of phase with one another. These out of phase beams 134, 146 are passed through a sample 150 (e.g., analytes) and reference medium 160, respectively, creating a sampled beam 154 and a referenced beam 166, respectively. These beams are combined at combiner 170 into a combined beam 174 and detected by the single detector 180.

The light source 110 may be any appropriate light source known to those skilled in the art. In one exemplary embodiment, an EC-QCL (MIRcat, DRS Daylight Solutions) tunable from 1376-1776 $cm^{-1}$ and pulsed at 100 kHz (f) with a duty cycle of 9.8% was used as a mid-IR source, for example.

Figure 2:
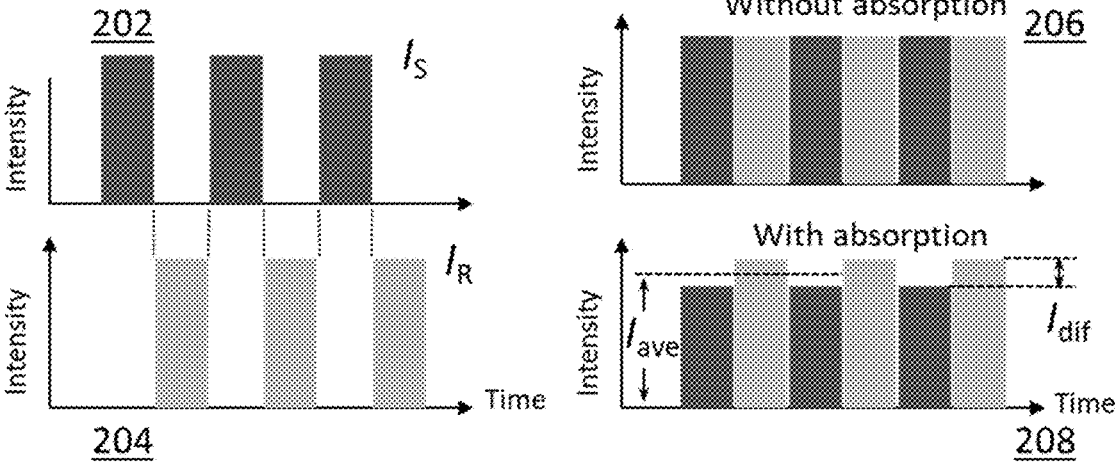
FIG. 2 shows a series of plots representing beam intensity of an exemplary double-path, intensity-modulated spectroscopy system.

The light intensities $I_S$, $I_R$ of the two beams are adjusted to be the same as shown on the left side of FIG. 2 in graphs 202 and 204. In the absence of analytes, the intensity appears to be constant as shown in graph 206. If light is absorbed by the analytes, the reduced transmission of the sample beam will cause the detected signal modulated synchronously to the modulation frequency as shown in graph 208, resulting in an intensity difference, $I_{dif}$, and an intensity average, $I_{ave}$. The signal change processed by a lock-in amplifier can be converted to transmittance or absorbance. If the transmittance or the absorbance is measured as a function of the wavelength of the incident light, it can generate a transmission spectrum or an absorption spectrum of the analytes.

The intensity modulation of the two beams can be performed in various ways known to those skilled in the art. For example, and without limitation, single or doble optical choppers, oscillating or rotating mirrors, or acousto-optic modulators may be used to modulate the beams. The relative phase of the two modulators may be locked out of phase either by mechanical geometry or by external phase controllers.

The modulators 130, 140 may be any appropriate modulators known in the art and may include additional modulators. In one exemplary embodiment, for example, three acousto-optic modulators (AOM, Brimose) controlled the light intensity as a function of wavelength (for solvent absorption compensation (SAC)) and modulated the two beams on and off (for double-beam modulation). The beam was first diffracted by a common AOM unit ($AOM_C$), which compensated for the strong light absorption of solvent by attenuating the light intensity as a function of wavelength. The beam from $AOM_C$ was then split into sample and reference paths and passed through parallel AOMs, denoted as $AOM_S$ and $AOM_R$ for the sample and the reference paths, respectively. $AOM_S$ and $AOM_R$ controlled both the intensity and phase of the beams. The beams from $AOM_S$ and $AOM_R$ diffracted in the opposite direction to the first diffraction direction at $AOM_C$ for compensation of wavenumber-dependent dispersion.

Each AOM may be controlled by a radio-frequency (RF) driver, for example. Analog signals may be generated by a current output device. Digital pulses generated by a pulse generator may modulate the two beam intensities out-of-phase to each other at a desired beam modulation frequency ($f_{BM}$).

Fast modulation eliminates noises from slower sources and is therefore often preferred. Preferably, the beams are modulated at a frequency of above 10 Hz, and more preferably above 100 Hz. Most preferably, the beams are modulated at or above 50 kHz. Mechanical choppers can provide 10 Hz to 10 KHz for the modulation frequency. Acousto-optic modulators and electro-optic modulators can be operated at as 1 Hz to 1 MHz range. Mechanical modulators can be used with separate intensity controllers to equalize the intensity of the two paths. Acousto-optic modulators can adjust the diffraction efficiency while the intensity is modulated so that they do not require additional intensity controllers.

The sample medium 150 and reference medium 160 may be contained in a sample cell and a reference cell, respectively, and those cells may be any appropriate cells known to those skilled in the art. An exemplary embodiment included, for example, liquid flow cells (GS20572, Specac) having two 3 mm thick $CaF_2$ windows and a lead spacer with a nominal path length of 26 μm. The reference cell was filled with distilled water and sealed during the measurement. The sample cell was filled with either an analyte solution or a solvent. A syringe pump (Pump 33 DDS, Harvard Apparatus) was used to replace liquids in the sample cell. A volume of 600 μL liquid was infused with a flow rate of 50 μL/min, and a single liquid replacement took 12 min. The entire optical system was enclosed and continuously purged with dry air. Bovine serum albumin (BSA, >96%, Sigma-Aldrich) was used as received. A stock solution of BSA in distilled water was prepared at 10 mg/mL and diluted to desired concentrations in the range of 1 down to 0.02 mg/mL.

The combiner 170 may be any appropriate combiner known to those skilled in the art. In one exemplary embodiment, after passing through a sample cell and a reference cell separately, the two parallel beams (sampled beam and referenced beam) were focused by an off-axis parabolic mirror (effective focal length=75 mm, MPD239-M03, Thorlabs) onto a single detector, for example.

The single detector 180 may be any appropriate detector known to those skilled in the art. In one exemplary embodiment, a single-element thermo-electrically cooled MCT detector (MCT-7-TE4, Infrared Associates) was used, for example.

For the best sensitivity of the signal difference between the two paths, the intensities of the two paths are as close to each other as possible in the absence of analytes. The difference signal, $I_{dif}=I_S-I_R$, can be divided by the average intensity, $I_{ave}=(I_S+I_R)/2$, which will eliminate the noises from slower environment drift or laser fluctuation.

In an exemplary embodiment, the signal from the single detector may be processed by two lock-in amplifiers (e.g., LIA, SR830, Stanford Research System) in parallel. One LIA (denoted as $LIA_a$) may measure the average signal ($I_a$) synchronized with $f_L$ received from the EC-QCL driver. The other LIA (denoted as $LIA_d$), synchronized with $f_{BM}$, may measure the difference signal ($I_d$). $I_{ave}$ and $I_{dif}$ signals may be simultaneously read by a multifunctional I/O device (e.g., PCIe-6374, National Instruments) operatively coupled to a control/acquisition computer. The time constant for both LIAs may be, e.g., 30 ms for spectral scanning measurement and 10 ms for fixed-wavelength measurement. The sensitivities may be, e.g., 1 V and 0.2 V for $LIA_a$ and $LIA_d$, respectively.

In an exemplary method, when the sample cell was filled with a solvent, the intensity difference between $I_S$ and $I_R$ may be calibrated to zero. When analytes in the sample cell absorb the light, the intensity difference between $I_S$ and $I_R$ may become nonzero. The average signal, $I_{ave}=(I_S+I_R)/2$, may be measured with a lock-in amplifier ($LIA_a$) synchronized with the laser pulse frequency, $f_L$, with a time constant sufficiently longer than the beam modulation period. The difference signal, $I_{dif}=I_S-I_R$, may be measured by another lock-in amplifier ($LIA_d$) synchronized with the beam-modulation frequency, $f_{BM}$. $I_{ave}$ and $I_{dif}$ may be adjusted to be constant by the solvent absorption compensation technique, which uses the full dynamic range of the detection system and reduces the dynamic range associated noise contribution. In the presence of absorbing analytes in the sample cell, $I_{ave}$ decreases, and $I_{dif}$ increases at absorption frequencies.

The observed $I_{ave}$ and $I_{dif}$ signals can be converted to absorbance by a simple expression. The intensities of $I_S$ and $I_R$ are $$\begin{cases} I_S = I_{ave} - \dfrac{1}{2}I_{dif} \\ I_R = I_{ave} + \dfrac{1}{2}I_{dif} \end{cases} \tag{1}$$

Then, DBM absorbance, $A_{DBM}$ can be expressed as $$A_{DBM} = -\log\left(\frac{I_S/I_R}{I_S^o/I_R^o}\right) = -\log\left[\frac{(2I_{ave} - I_{dif})}{(2I_{ave} + I_{dif})}\right] + \log\left[\frac{(2I_{ave}^o - I_{dif}^o)}{(2I_{ave}^o + I_{dif}^o)}\right] \quad (2)$$

where $I_S^{\circ}$ and $I_R^{\circ}$ are intensities when a solvent is in the sample cell. Even though the system used a single detector, the DBM technique still takes advantage of a double-beam configuration, which suppresses common-mode fluctuations between the two beam paths using their intensity ratio, $(I_S/I_R)/(I_S^{\circ}/I_R^{\circ})$. To examine the advantage of a double-beam configuration, we may compare the DBM absorbance with a no-modulation absorbance. The no-modulation absorbance, $A_{no-mod}$, may be calculated only with $I_{ave}^{\circ}$ and $I_{ave}$ without considering the modulation signals, $I_{dif}^{\circ}$ and $I_{dif}$. For this calculation, it is assumed that the reference path signals are equal for $I_R = I_R^{\circ} = I_S^{\circ}$, which leads to $I_{dif}^{\circ} = 0$ and $I_{dif} = 2$ $(I_{ave}^{\circ} - I_{ave})$ in Eq. (2). Then, $A_{no-mod}$ is expressed as $$A_{no-mod} = -\log\left[(2I_{ave} - I_{ave}^o)/I_{ave}^o\right] \quad (3)$$

Turning now to FIG. 3, an exemplary method 300 of determining an optical spectrum for a sample substance using an exemplary system described above is shown. At block 305, a source beam from a light source is received. At block 310, the source beam is split into a reference beam and a sample beam. At block 315, the reference beam and sample beam are intensity-modulated out of phase of each other. At block 320, the modulated reference beam is directed into a reference cell having a reference substance therein. The reference substance interacts with the modulated reference beam, yielding a referenced beam having a reference direction. At block 325, the modulated sample beam is directed into a sample cell having a sample substance therein. The sample substance interacts with the modulated sample beam, yielding a sampled beam having a sample direction. At block 330, the referenced beam and the sampled beam are combined into a combined beam. At block 335, the combined beam is directed to a single detector. At block 340 an intensity difference of the sampled beam and the referenced beam in the combined beam is detected. At block 345 an intensity average of the sampled beam and the referenced beam in the combined beam is detected. At block 350 one of an absorbance or transmittance from the detected difference is calculated. At block 355 a spectrum of the sample as a function of the one of the absorbance or transmittance for a plurality of light frequencies is determined.

Single-detector double-path intensity-modulation spectrometer can be made of various elements and components that are microfabricated. Elements of single-detector double-path intensity-modulation spectrometer can be various sizes.

Elements of single-detector double-path intensity-modulation spectrometer can be made of a material that is physically or chemically resilient in an environment in which single-detector double-path intensity-modulation spectrometer is disposed. Exemplary materials include a metal, ceramic, thermoplastic, glass, semiconductor, and the like. The elements of single-detector double-path intensity-modulation spectrometer can be made of the same or different material and can be monolithic in a single physical body or can be separate members that are phsycially joined.

Single-detector double-path intensity-modulation spectrometer can be made in various ways. It should be appreciated that single-detector double-path intensity-modulation spectrometer includes a number of optical, electrical, or mechanical components, wherein such components can be interconnected and placed in communication (e.g., optical communication, electrical communication, mechanical communication, and the like) by physical, chemical, optical, or free-space interconnects. The components can be disposed on mounts that can be disposed on a bulkhead for alignment or physical compartmentalization. As a result, single-detector double-path intensity-modulation spectrometer can be disposed in a terrestrial environment or space environment. Elements of single-detector double-path intensity-modulation spectrometer can be formed from silicon, silicon nitride, and the like although other suitable materials, such ceramic, glass, or metal can be used. Accordingly, single-detector double-path intensity-modulation spectrometer can be made by additive or subtractive manufacturing.

The processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware, or a combination thereof.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

Any logical blocks, modules, and algorithm elements described or used in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described or used in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix (s) as used herein is intended to include both the singular and the plural of the term that it modifies, thereby including at least one of that term (e.g., the colorant(s) includes at least one colorants). Option, optional, or optionally means that the subsequently described event or circumstance can or cannot occur, and that the description includes instances where the event occurs and instances where it does not. As used herein, combination is inclusive of blends, mixtures, alloys, reaction products, collection of elements, and the like.

As used herein, a combination thereof refers to a combination comprising at least one of the named constituents, components, compounds, or elements, optionally together with one or more of the same class of constituents, components, compounds, or elements.

All references are incorporated herein by reference.

The use of the terms "a," "an," and "the" and similar referents in the context of describing the invention (especially in the context of the following claims) are to be construed to cover both the singular and the plural, unless otherwise indicated herein or clearly contradicted by context. It can further be noted that the terms first, second, primary, secondary, and the like herein do not denote any order, quantity, or importance, but rather are used to distinguish one element from another. It will also be understood that, although the terms first, second, etc. are, in some instances, used herein to describe various elements, these elements should not be limited by these terms. For example, a first current could be termed a second current, and, similarly, a second current could be termed a first current, without departing from the scope of the various described embodiments. The first current and the second current are both currents, but they are not the same condition unless explicitly stated as such.

The modifier about used in connection with a quantity is inclusive of the stated value and has the meaning dictated by the context (e.g., it includes the degree of error associated with measurement of the particular quantity). The conjunction or is used to link objects of a list or alternatives and is not disjunctive; rather the elements can be used separately or can be combined together under appropriate circumstances.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A double path spectrophotometry system comprising:
 a light source;
 a splitter configured to split the light source beam into a sample beam and a reference beam path;
 a sample beam path intensity modulator configured to intensity-modulate the sample beam into an intensity-modulated sample beam;
 a reference beam path intensity modulator configured to intensity-modulate the reference beam into an intensity-modulated reference beam out of phase with the intensity-modulated sample beam;
 a sample cell, wherein the system is configured to pass the intensity-modulated sample beam through the sample cell to create a sampled beam;
 a reference cell, wherein the system is configured to pass the intensity-modulated reference beam through the reference cell to create a referenced beam;
 a combiner configured to combine the sampled beam and the referenced beam into a combined beam;
 a detector configured to detect the intensity of the combined beam, thereby measuring a modulation signal:

a processor configured to detect an intensity difference of the sampled beam and the referenced beam in the combined beam, calculate one of an absorbance or transmittance from the detected intensity difference, and determine a spectrum of the sample as a function of the one of the absorbance or transmittance for a plurality of light frequencies.

2. The double path spectrophotometry system of claim 1, further comprising:

a preamplifier;

a lock-in amplifier; and a controlling program and computer interface.

3. The double path spectrophotometry system of claim 1, wherein the splitter is a beam splitter.

4. The double path spectrophotometry system of claim 1, wherein the combiner is a focusing optics.

5. The double path spectrophotometry system of claim 1, wherein a relative phase of the sample beam path intensity modulator and the reference beam path intensity modulator is locked out of phase by means of the mechanical geometry of the system.

6. The double path spectrophotometry system of claim 1, wherein a relative phase of the sample beam path intensity modulator and the reference beam path intensity modulator is locked out of phase by a phase controller.

7. The double path spectrophotometry system of claim 1, wherein an intensity of the sampled beam and an intensity of the referenced beam are equal when the reference cell and sample cell are filled with a same substance.

8. The double path spectrophotometry system of claim 1, wherein an intensity of the sampled beam and an intensity of the referenced beam differ by no more than twenty-five percent when the reference cell and sample cell are filled with a same substance.

9. The double path spectrophotometry system of claim 1, wherein the intensity modulators are mechanical choppers.

10. The double path spectrophotometry system of claim 1, wherein the intensity modulators are acousto-optic modulators.

11. The double path spectrophotometry system of claim 1, wherein the intensity modulators are electro-optic modulators.

12. The double path spectrophotometry system of claim 2, wherein an intensity difference of the measured modulation signal is amplified by the lock-in amplifier and recorded as a function of wavelength.

13. A method of determining an optical spectrum for a sample substance, the method comprising:

receiving a source beam from a light source;

splitting the source beam into a reference beam and a sample beam;

modulating an intensity of the reference beam and an intensity of the sample beam out of phase of each other;

directing the modulated reference beam into a reference cell having a reference substance therein, said reference substance interacting with the modulated reference beam, said interacting yielding a referenced beam having a reference direction;

directing the modulated sample beam into a sample cell having a sample substance therein, said sample substance interacting with the modulated sample beam, said interacting yielding a sampled beam having a sample direction;

combining the referenced beam and the sampled beam into a combined beam;

directing the combined beam to a single detector;

detecting an intensity difference of the sampled beam and the referenced beam in the combined beam;

calculating one of an absorbance or transmittance from the detected intensity difference; and determining a spectrum of the sample as a function of the one of the absorbance or transmittance for a plurality of light frequencies.

* * * * *